March 1, 1932.                A. SCHNEIDER                1,847,787

MECHANISM FOR OPERATING VEHICLE LIFTING JACKS

Filed Nov. 27, 1928        4 Sheets-Sheet 1

INVENTOR.
Alfons Schneider.
By William C. Luton
Atty.

March 1, 1932. A. SCHNEIDER 1,847,787
MECHANISM FOR OPERATING VEHICLE LIFTING JACKS
Filed Nov. 27, 1928 4 Sheets-Sheet 2
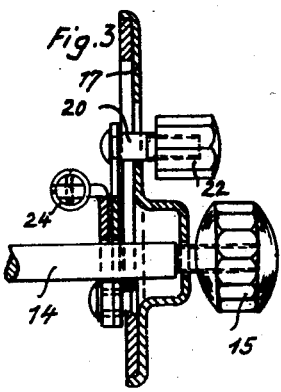
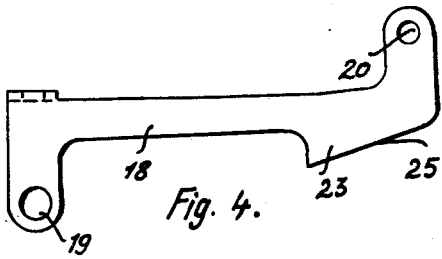
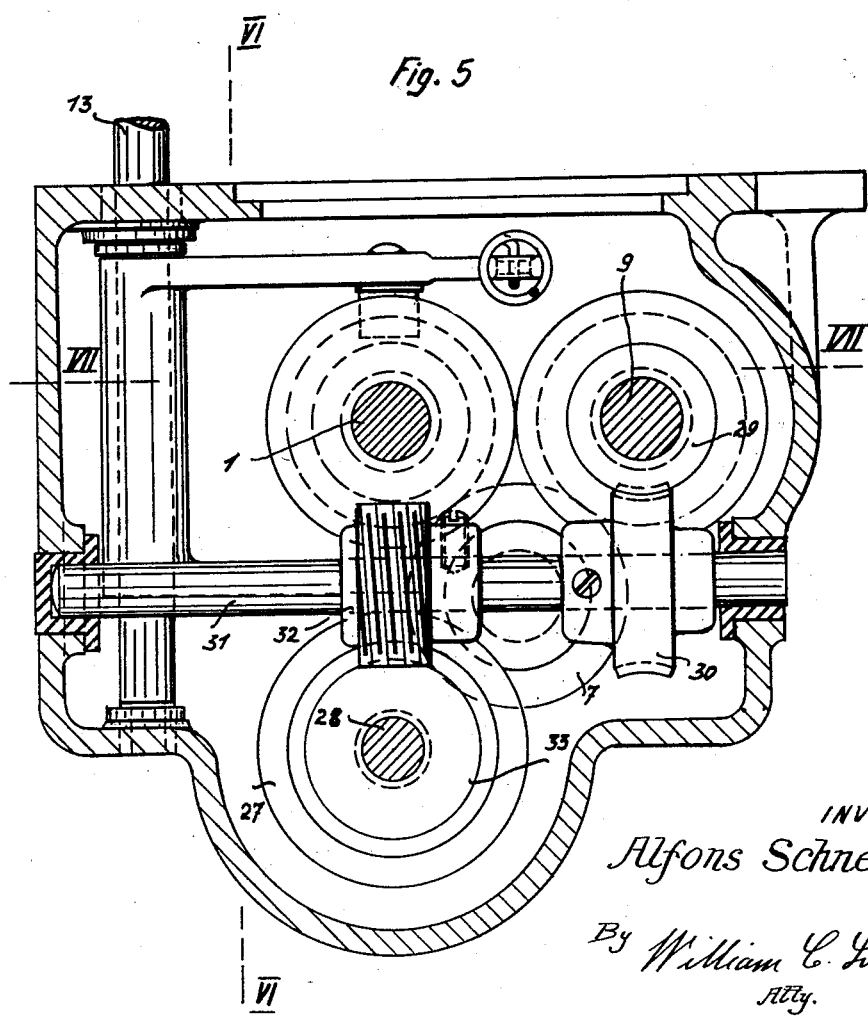
INVENTOR.
Alfons Schneider.
By William C. Linton
Atty.

March 1, 1932.   A. SCHNEIDER   1,847,787
MECHANISM FOR OPERATING VEHICLE LIFTING JACKS
Filed Nov. 27, 1928    4 Sheets-Sheet 3
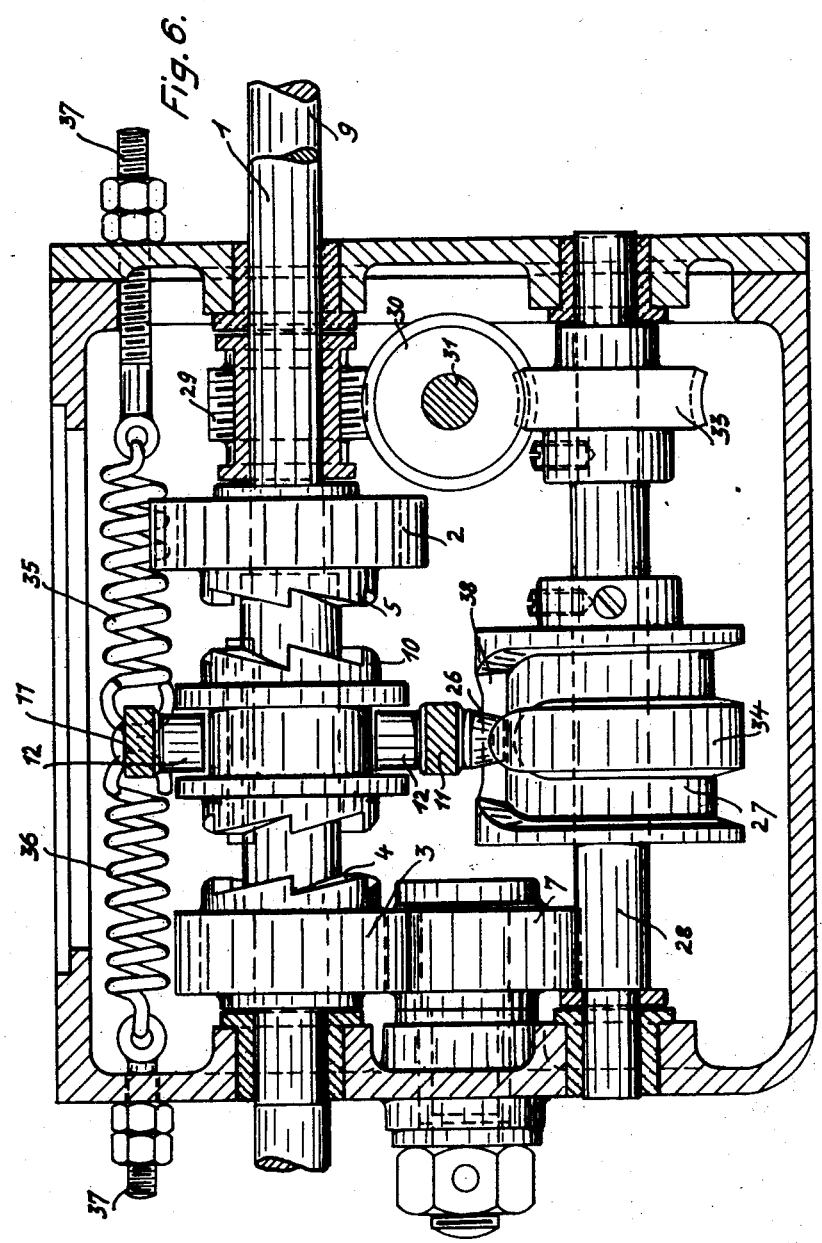
INVENTOR.
Alfons Schneider
By William C. Linton
Atty.

March 1, 1932. A. SCHNEIDER 1,847,787
MECHANISM FOR OPERATING VEHICLE LIFTING JACKS
Filed Nov. 27, 1928 4 Sheets-Sheet 4

INVENTOR.
Alfons Schneider
By William C. Linton
Atty.

Patented Mar. 1, 1932

1,847,787

UNITED STATES PATENT OFFICE

ALFONS SCHNEIDER, OF MUNICH, GERMANY

MECHANISM FOR OPERATING VEHICLE LIFTING JACKS

Application filed November 27, 1928, Serial No. 322,281, and in Germany February 18, 1928.

The invention relates to mechanism for operating vehicle lifting jacks, in which a shaft operating the jack is driven by the engine of the vehicle. With mechanism of this kind the shaft must rotate in opposite directions for lifting and lowering, and my invention provides new or improved automatic means for stopping the shaft when the jack reaches either of its end positions, and causing it to rotate in the opposite direction when restarted.

Figure 1:
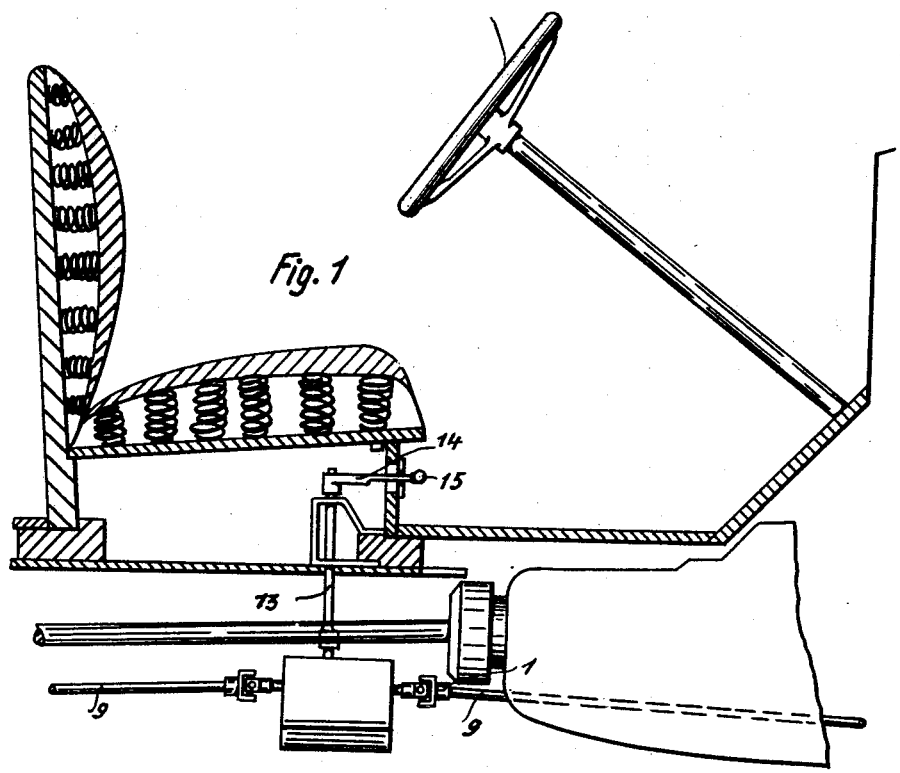
Figure 2:
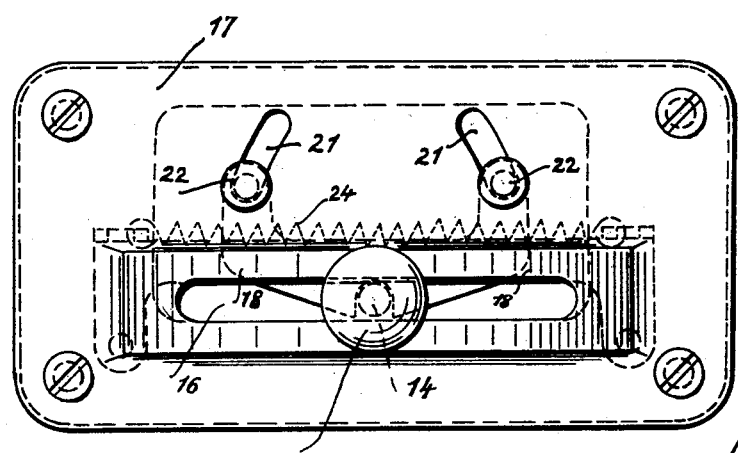
Figure 7:
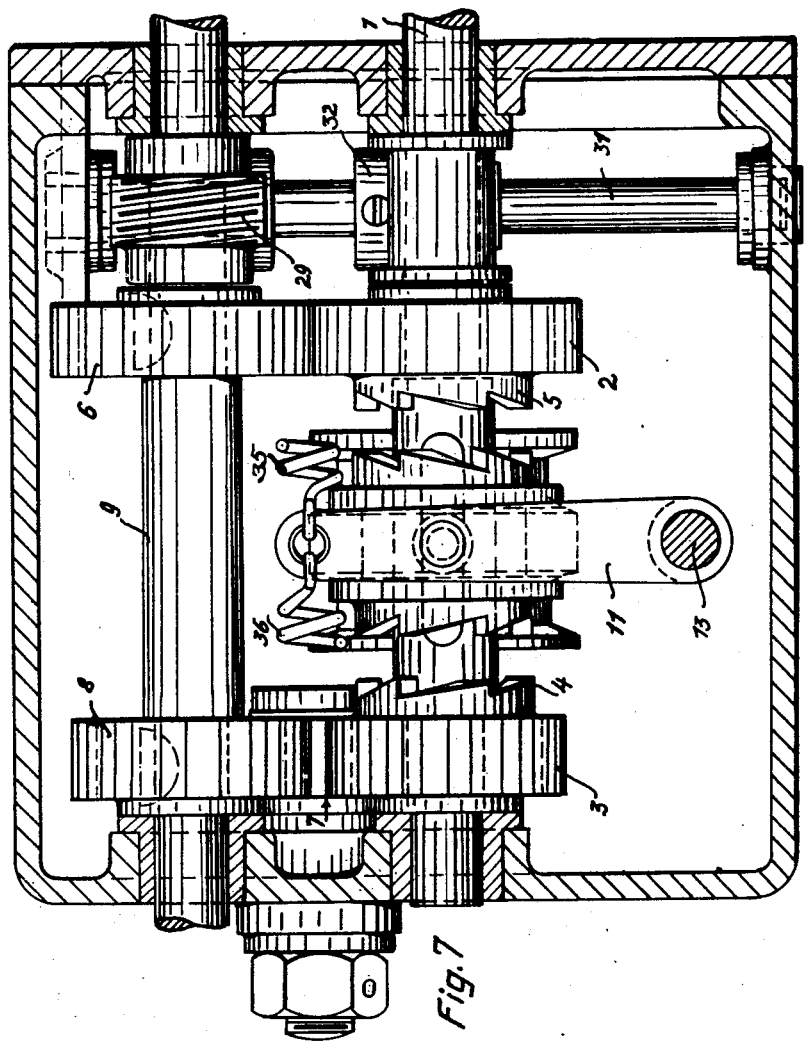

An example of apparatus according to the invention is illustrated in the accompanying drawings, in which Fig. 1 is a general view of the mechanism in elevation, Fig. 2 is a front view of the control lever, Fig. 3 a side elevation of the control device partly in section, Fig. 4 shows a detail of the control device, Fig. 5 a section of the driving gear, Fig. 6 a section taken on the line VI—VI of Fig. 5, and Fig. 7 a section taken on the line VII—VII of Fig. 5.

The drive is derived from the engine by means of toothed gear wheels, chain wheels or the like, and is transmitted to the shaft 1. Two spur wheels 2 and 3 are loosely mounted on the shaft 1 (Figs. 6 and 7), and are provided on one side with clutch dogs 5 and 4 respectively. The spur wheel 2 meshes directly with a spur wheel 6 on the jack operating shaft 9 (Fig. 7), and the spur wheel 3 is indirectly in engagement with a spur wheel 8 on the said shaft by means of an idle spur wheel 7. The shaft 9 extends to the jack spindles and operates them through bevel, spur or worm wheels. Between the wheels 2 and 3 there is a slide clutch member 10 actuated by a forked lever 11, whose rollers 12 engage the clutch member. The forked lever 11 turns about a shaft 13 operated by a lever 14 terminating in a knob 15 (Figs. 1 and 7). The lever 14 is movable in a slot 16 in a guide plate 17. On the rear face of the guide plate 17 there are levers 18 (Fig. 4) rotatable about pivots 19 and resting on the lever 14. Pins 20 on the levers 18 pass through slots 21 and terminate in knobs 22 for manual operation. In order to release the lever 14 for movement from its central position (Fig. 2), in order to engage the clutch, the knob 22 on the side to which it is desired to move the lever 14 is lifted, so that one of the projections 23 is moved out of the path of the lever. A spring 24 moves the levers 18 to their lowermost positions. When the lever 14 is returned to its central position one of the levers 18 slides on the lever 14 with its inclined edge 25, and is raised until the lever 14 is in the central position, when the lever 18 drops and the lever 14 is locked between the projections 23.

Another roller 26 is provided on the forked lever 11, this roller engaging a grooved cam drum 27 on a shaft 28 driven by the shaft 9 through the worm gearing 29, 30, 31, 32 and 33. The transmission ratio of the worm gearing is such that the cam drum 27 performs nearly one revolution while the shaft 9 performs a sufficient number of revolutions to move the jack spindle from one end position to the other. As the cam drum 27 rotates, the roller 26 runs round the side of the central rib 34, being moved from one side to the other and carrying with it the clutch member 10, which engages alternately with the spur wheels 2 and 3 to cause backward or forward rotation of the jack spindle. Springs 35, 36, whose tension can be adjusted by bolts 37, tend to keep the lever 11 in its central position. If the lever 11 is moved to the wrong side so that the clutch is engaged, say, for lowering the jack when it is already in the lowered position, the resulting rotation of the shaft 28 causes the face 38 of the cam drum to act on the roller 26 and return it to the central position, thereby disengaging the clutch.

The mechanism operates as follows:—If the jack, fixed to the axle of the vehicle, is to be operated for jacking up the vehicle, the engine is started and the shaft 1 is rotated. The clutch member 10 slidably keyed to the shaft 1 also rotates. The knob 22 marked "up" is lifted and the knob 15 is moved to the side unobstructed by the lever 18. This brings the roller 26 to one side of the central rib 34, and the clutch member 10 is engaged with the wheel 2. When the vehicle is raised, that is when the jack spindle reaches its end position, the cam drum 27 will have completed its rotation so that the roller 26 is returned to its central position and the clutch member 10 is disengaged from the wheel 2. For lowering the vehicle the knob 22 marked "down" is lifted and the knob 15 is moved to the other side. This operation engages the clutch member 10 with the gear wheel 4, so that the shaft 9 rotates in the direction for lowering the jack until it is stopped by disengagement of the clutch when the cam drum has completed its rotation.

Having now particularly described and ascertained the nature of my said invention and in what manner the same is to be performed, I declare that what I claim is:—

1. A jack operating mechanism comprising a driving shaft, a clutch member keyed to said shaft and slidable thereon, a movable clutch operating element for sliding said clutch member on the shaft into clutch engaging position, a pair of oppositely pivoted levers normally engaging said element for holding the same against movement, said levers being independently operable for permitting lateral movement of said movable clutch operating element and both of said levers adapted to automatically lock said element upon return to its central position, a jack operating shaft, gearings between the driving shaft and the jack operating shaft adapted to rotate the latter through actuation of the clutch member, a third shaft rotated through the driving shaft and a cam rotating with said third shaft, engageable with the movable clutch operating element for holding the clutch member in clutch engaging position and adapted to return the clutch to clutch disengaging position at a predetermined time.

2. A jack operating mechanism comprising a driving shaft, a reversible clutch member keyed to said shaft and slidable thereon, means for sliding said clutch member on the shaft into clutch engaging position, a jack operating shaft, gearings between the driving shaft and the jack operating shaft adapted to rotate the latter through actuation of the clutch member, in one direction to raise the jack or in a reverse direction to lower the jack dependent upon the position of the reversible clutch, a third shaft rotated through the driving shaft and a two-way cam rotating with said third shaft, engageable with the reversible clutch sliding means for holding the reversible clutch in either of its clutch engaging positions and adapted to return the clutch to its neutral position at a predetermined time.

3. In a jack operating mechanism, the combination with a clutch for actuating said mechanism and manually operated means for operating the clutch, of a pair of oppositely pivoted levers normally engaging said element for holding the same against movement, said levers being independently operable for permitting lateral movement of said clutch operating means and both of said levers adapted to automatically lock said means upon return to its central position.

4. In a jack operating mechanism, the combination with a reversible clutch for actuating said mechanism and means for throwing said reversible clutch in either of its clutch engaging positions, of a driven two-way cam engageable with said means for holding the reversible clutch in either of its mentioned positions and adapted to return the same to its neutral position at a predetermined time.

5. In a jack operating mechanism, the combination with a reversible clutch for actuating said mechanism and means for throwing the reversible clutch in either of its clutch engaging positions, of a pair of oppositely pivoted levers normally engaging said means for holding the same against movement, said levers being independently operable for permitting lateral movement of said clutch throwing means and both of said levers adapted to automatically lock said means upon return to its central position, and a driven two-way cam engageable with said means for holding the reversible clutch in either of its mentioned positions and adapted to return the clutch to its neutral position at a predetermined time.

In testimony whereof I have affixed my signature.

ALFONS SCHNEIDER.